United States Patent
Beetz et al.

(10) Patent No.: US 8,301,021 B2
(45) Date of Patent: Oct. 30, 2012

(54) HEATING DEVICE FOR FUEL

(75) Inventors: Klaus Dr. Beetz, Karlsruhe (DE); Gerd Kissner, Stuttgart (DE)

(73) Assignee: Mahle International GmbH (DE)

( * ) Notice: Subject to any disclaimer, the term of this patent is extended or adjusted under 35 U.S.C. 154(b) by 986 days.

(21) Appl. No.: 12/336,816

(22) Filed: Dec. 17, 2008

(65) Prior Publication Data

US 2009/0162041 A1 Jun. 25, 2009

(30) Foreign Application Priority Data

Dec. 21, 2007 (DE) .......................... 10 2007 062 153
Oct. 23, 2008 (DE) .......................... 10 2008 052 918

(51) Int. Cl.
*F24H 1/10* (2006.01)
*A47J 31/00* (2006.01)

(52) U.S. Cl. ......... 392/485; 392/465; 392/497; 392/502

(58) Field of Classification Search .................. None
See application file for complete search history.

(56) References Cited

U.S. PATENT DOCUMENTS

| | | | | |
|---|---|---|---|---|
| 2,554,745 A * | 5/1951 | Kapsch | ...................... | 392/497 |
| 3,842,188 A * | 10/1974 | Petersen | .................... | 174/545 |
| 4,238,666 A * | 12/1980 | Pomper | ...................... | 392/448 |
| 4,375,589 A * | 3/1983 | Combs | ........................ | 392/441 |
| 4,431,983 A * | 2/1984 | Rodriguez | .................. | 338/220 |
| 4,635,026 A * | 1/1987 | Takeuchi | .................. | 338/22 SD |
| 5,153,555 A | 10/1992 | Enomoto et al. | | |
| 6,080,973 A * | 6/2000 | Thweatt, Jr. | .................. | 219/497 |
| 6,402,943 B1 * | 6/2002 | Bohlender | .................... | 210/184 |
| 6,611,660 B1 * | 8/2003 | Sagal | ............................ | 392/497 |
| 7,313,322 B2 * | 12/2007 | Starck et al. | .................. | 392/441 |
| 7,860,381 B2 * | 12/2010 | Wallhaeusser et al. | ....... | 392/485 |

(Continued)

FOREIGN PATENT DOCUMENTS

DE 29911711 U1 10/1999

(Continued)

OTHER PUBLICATIONS

English abstract for EP-1510685.

(Continued)

*Primary Examiner* — Thor Campbell
(74) *Attorney, Agent, or Firm* — Rader, Fishman & Grauer PLLC

(57) ABSTRACT

The present invention relates to a heating device (1) for fuel with at least one PTC heating element (5) and a heat transfer device (6) in thermal contact with the latter, which exhibits two heat transfer elements (7, 7'), and with a tubular casing (2) made of plastic that envelop the heat transfer device (6) and the a least one PTC heating element (5), wherein the diesel fuel to be heated flows through the casing (2) and around the heat transfer device (6) during operation of the heating device (1). Provided on the interior side of the tubular casing (2) is a guiding device that interacts with the at least one PTC heating element (5) and/or the heat transfer device (6) in such a way that at least one PTC heating element (5) and the heat transfer device (6) can be axially inserted into the casing (2) for assembling the heating device (1). Of significance relative to the invention in this case is that a spring system (8, 18) separate from the heat transfer device (6) is provided, which tensions the heat transfer device (6) against the guiding device so as to fix it in place.

19 Claims, 3 Drawing Sheets

U.S. PATENT DOCUMENTS

2008/0124062 A1 * 5/2008 Wallhaeusser et al. ....... 392/485

FOREIGN PATENT DOCUMENTS

| | | |
|---|---|---|
| DE | 102006055216 | 11/2006 |
| EP | 1036930 | 3/1999 |
| EP | 1036930 A1 | 9/2000 |
| EP | 1385073 | 1/2004 |
| EP | 1385073 A2 | 1/2004 |
| EP | 1510685 | 3/2005 |
| FR | 2634090 A1 | 1/1990 |
| GB | 2146488 A | 4/1985 |

OTHER PUBLICATIONS

English abstract for EP-1385073.
European Search Report for 08170769.7.
English abstract for FR2634090.
English abstract for EP1385073.

* cited by examiner

HEATING DEVICE FOR FUEL

CROSS-REFERENCES TO RELATED APPLICATION

This application claims priority to German patent application DE 10 2008 052 918.4 filed Oct. 23, 2008, which claims priority based on German Patent Application No. DE 10 2007 062 153.3 filed Dec. 21, 2007, both of which are hereby incorporated by reference in their entirety.

The present invention relates to a heating device for fuel, in particular for diesel fuel, with at least one PTC heating element and a heat transfer device in thermal contact with the latter according to the preamble to claim 1. The invention also relates to a motor vehicle equipped with such a heating device.

The use of heating devices for heating the fuel to be filtered has long been known for being able to maintain the filtering action of a diesel fuel filter even at low temperatures. The heating process liquefies the share of paraffin contained in the diesel fuel, which would otherwise precipitate at low temperatures and could end up clogging the fuel filter. Numerous heating devices are here designed as so-called "PTC" heating elements, which exhibit cold-conducting thermistors having a positive temperature coefficient.

A generic heating device is known from DE 10 2006 055 216 A1, which provides for several PTC heating elements and a heat transfer device in thermal contact with the latter, which exhibits two heat transfer elements. The heat transfer device and the at least one PTC heating element are arranged in a tubular casing made of plastic, through which the diesel fuel to be heated flows during heating device operation.

A heating device for diesel fuel that utilizes at least one PTC heating element is also known from EP 1 036 930 B1. In this heating device, a heat-conducting unit with two parallel adjacent tubular sections is in thermal contact with the PTC heating elements. During heating device operation, the heat-conducting units are awash in diesel fuel to be heated, wherein the two parallel adjacent tubular sections of the heat-conducting units are made of heat-conducting sheet metal, so that they are intended to ensure an especially efficient heat transfer.

However, the disadvantage to the known heating device is that it is difficult to assemble, since the PTC heating elements are initially jammed between the two heat-conducting units, and this arrangement must then be fixed in a tubular plastic casing.

Therefore, the object of the present invention is to indicate an improved or at least different design for a generic heating device that is characterized in particular by simplified assembly.

This object is achieved according to the invention by the subject matter of the independent claims. The dependent claims describe advantageous embodiments.

The invention is based on the general idea of providing a tubular casing made of plastic to incorporate several PTC heating elements along with a heat-transfer device with an internal guiding device, which enables a positionally accurate axial insertion of the PTC heating elements together with the heat transfer device, and simultaneously prevents an incorrect arrangement of PTC heating elements or the heat transfer device in the plastic casing, wherein a spring system separate from the heat transfer device is provided to prestress the heat transfer device against a guiding device so as to fix it in place. This enables a simple and positionally accurate assembly. The PTC heating elements are here in thermal contact with the heat transfer device and spring element, while the fuel to be heated, in particular the diesel fuel to be heated, stream around each of them during heating device operation. The guiding devices provided on one interior side of the tubular casing can consist of a guiding groove and/or guiding web, for example, which interacts with the at least one PTC heating element and/or the heat transfer device in the manner described above, so that the PTC heating elements and heat transfer device need only be inserted axially into the plastic casing for assembly of the heating device. By comparison to prior art, this greatly facilitates assembly of the heating device according to the invention, so that these can be manufactured more cost effectively.

It is best to provide the front of the heat transfer elements with fixing elements, which mesh or engage with corresponding recesses in the casing once the heat transfer device has been completely inserted into the casing. The fixing elements bend only after the fitting position of the heat transfer device has been reached.

The heat transfer device best exhibits two heat transfer elements, between which the PTC heating elements are positioned, wherein one heat transfer element accommodates a spring element, which prestresses the heat transfer devices and PTC heating elements against guiding devices of the inner casing wall of the tubular casing. The two heat transfer elements hence fix the PTC heating elements in place during incorporation into the casing, wherein the spring element exerts a clamping action on the PTC heating elements. In addition, the spring element reliably mounts the PTC heating elements in this fitting position, regardless of any temperature fluctuations. It is here also conceivable for the spring element to kind of latch with a correspondingly profiled interior wall of the casing, so that the spring element not just prestresses or fixes the PTC heating elements or heat transfer device against the casing in a radial direction, but secures the PTC heating elements or heat-conducting device so as to prevent any unintended shifting relative to the casing in an axial direction too.

In an advantageous further development of the solution according to the invention, the spring system is simultaneously designed as a flow-conducting element, i.e., as a turbolator, which forces the fuel to become thoroughly mixed as it flows through the heating device. To this end, the spring system can exhibit resilient sections that are inclined relative to the direction of flow of the diesel fuel to be heated, and in this way cause the diesel fuel to be heated to swirl while flowing through the heating device. In this way, the spring system according to the invention carries out two functions at the same time, namely reliably mounting the PTC heating element or heat transfer device in the casing, and thoroughly mixing the diesel fuel to be heated, so that diesel fuel with a uniform temperature exits the heating device.

The two heat transfer elements of the heat transfer device best consist of metal, in particular of sheet metal. This offers the major advantage of improved heat transfer on the one hand, and provides for a cost-effective design of the heat transfer elements on the other.

Other important features and advantages of the invention are outlined in the subclaims, the drawings and the accompanying figure description based on the drawings.

Of course, both the already mentioned and yet to be specified features can be used not just in the respectively indicated combination, but also in other combinations or individually, without going beyond the scope of the present invention.

Preferred exemplary embodiments of the invention are depicted in the drawings, and will be described in more detail in the following specification, wherein identical reference numbers denote the same or similar or functionally identical components.

Diagrammatically shown on:

Figure 4:
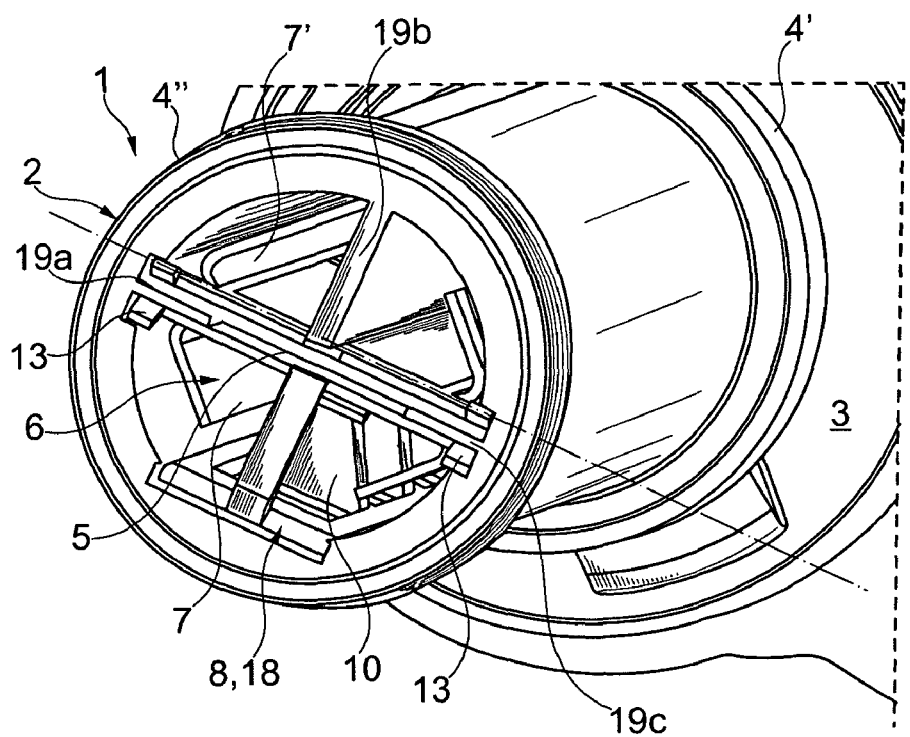
Figure 5:
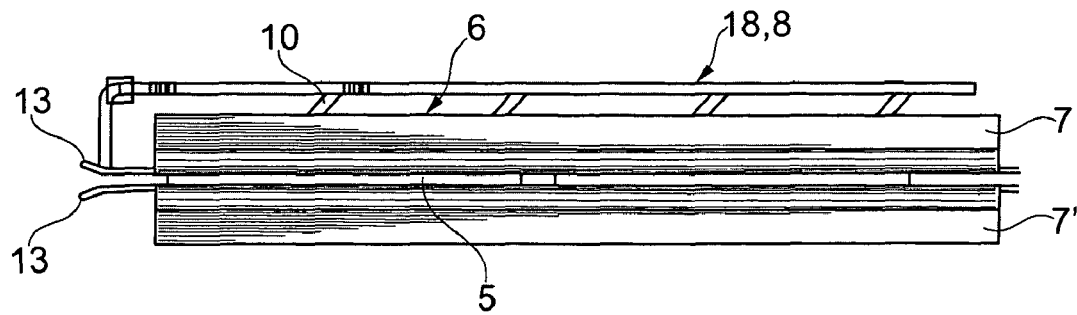
Figure 6:
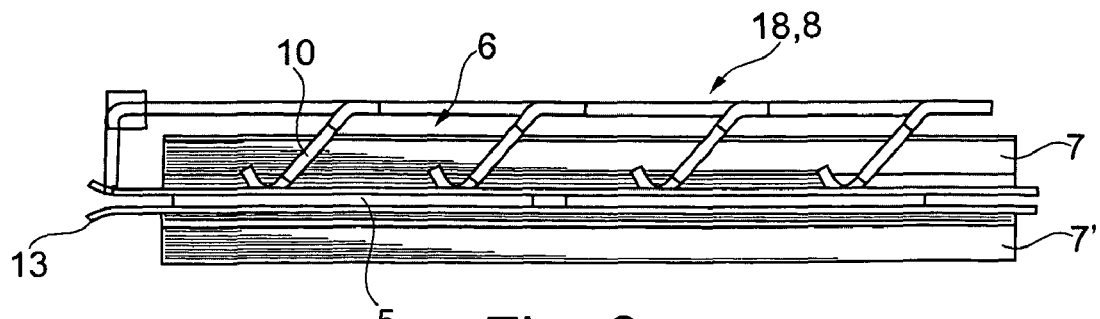

FIG. 4 another embodiment of a heating device according to the invention;

FIG. 5, 6 a respective possible embodiment of the heat transfer device.

Figure 1:
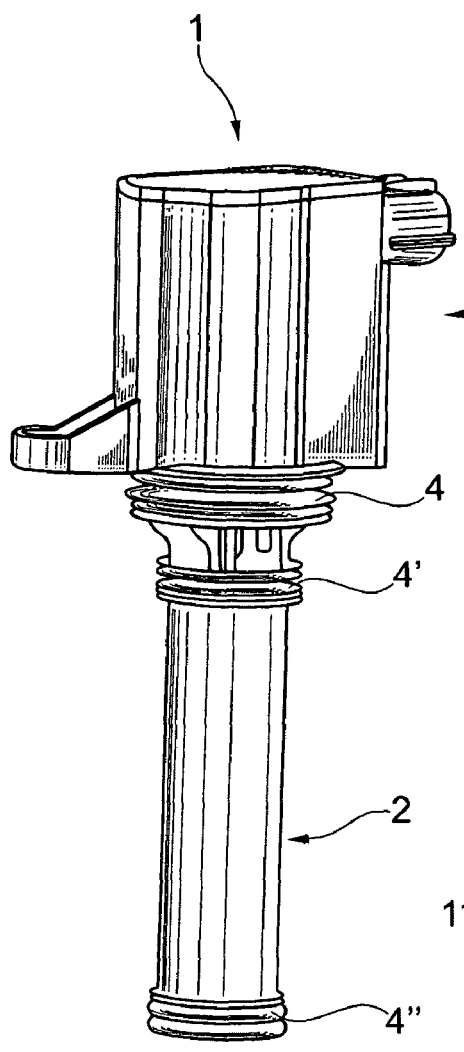
FIG. 1 is a heating device according to the invention.

In FIG. 1, a heating device 1 according to the invention for fuel, in particular diesel fuel, exhibits a tubular casing 2 along with a terminal enclosure 3 preferably gated thereupon. With its tubular casing 2, the heating device 1 is usually inserted axially into the interior space of a ring filter, and heats the diesel fuel to be filtered at low temperatures, to prevent the paraffin share from precipitating, and hence the ring filter from clogging. A total of three O-ring gaskets 4, 4' and 4" are here arranged on the tubular casing 2, wherein an inlet into the interior of the tubular casing 2 is provided in an axial area between the two O-ring gaskets 4 and 4'. The end of the tubular casing 2 facing away from the terminal enclosure 3 exhibits the O-ring gasket 4", which seals the interior of the ring filter in an axial direction.

Situated inside the tubular casing 2 is at least one PTC heating element 5 along with a heat transfer device 6 in thermal contact with the latter. "PTC" here stands for positive-temperature coefficient. In general, the tubular casing along with the terminal enclosure 3 are here made out of plastic, and preferably manufactured in a single operation, in particular gated. During operation of the heating device 1, the diesel fuel to be heated flows in a radial direction between the two O-ring gaskets 4 and 4'and into the casing 2, exiting the latter in an axial direction below the O-ring gasket 4.

Figure 2:
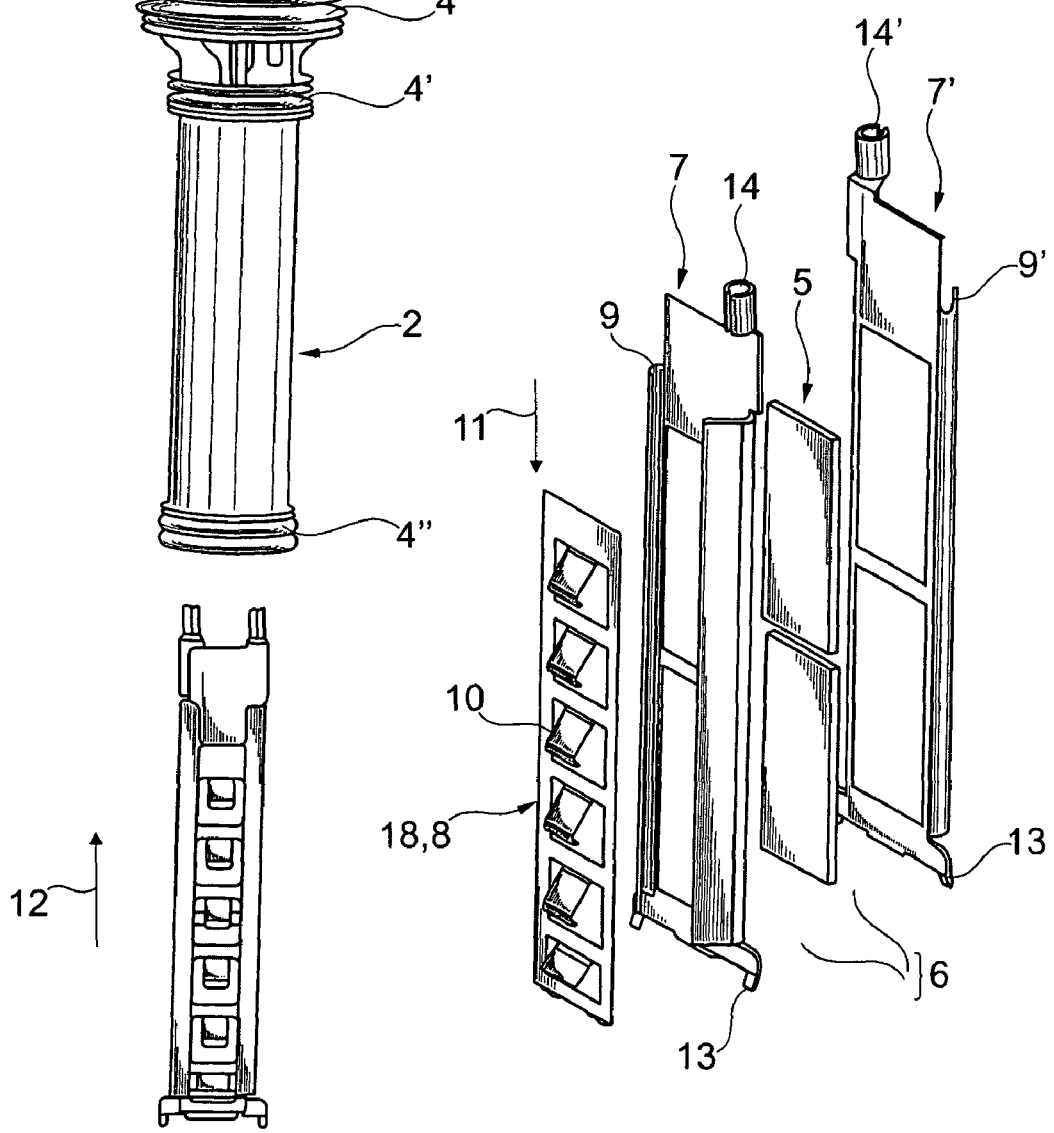
FIG. 2 is a detailed view of an area of the heating device according to the invention.

As evident from FIG. 2, the PTC heating elements 5 are arranged between two heat transfer elements 7 and 7', which together comprise the heat transfer device 6. The PTC heating element 5 is here fixed between the two heat transfer elements 7 and 7' by way of a clamping action. As evident in this case, a side of the respective heat transfer elements 7, 7' facing the PTC heating elements 5 is adjusted to the shape of the PTC heating elements 5, making it possible to achieve additional fixation. In general, the two heat transfer elements 7 and 7' are made of metal, in particular sheet metal, which helps achieve a high heat transfer rate on the one hand, and lowers the manufacturing costs for such heat transfer elements 7, 7' on the other, since these are structurally easy to manufacture. In addition, the flanks 9 and 9' of the heat transfer elements 7, 7' serve as turbolators to achieve an optimal heat transfer to the fuel. The shape can here be smooth as depicted, but also irregular. Further, the flanks 9 and 9' can consist of subsegments, which are varyingly tilted relative to each other, thereby improving the generation of turbulences.

According to FIG. 1, at least one of the two heat transfer elements 7 and 7' have a spring element 8, which tensions the heat transfer device 6, i.e., the two heat transfer elements 7, 7', against the PTC heating elements 5 and an interior casing wall of the casing 2. In principle, the terms spring element 8 and spring system 18 are used synonymously in the following. The PTC heating elements 5 can now be secured between the two heat transfer elements 7 and 7' of the heat transfer device 6 according to the invention, wherein the one spring element 8 is held against the interior casing wall by means of a guide/radial web 19 provided for this purpose. All components made according to FIG. 2 are combined to assemble the heating device 1 described in the invention, and inserted into the tubular casing 2 as a whole in an axial direction. This greatly facilitates the assembly of the heating device 1 according to the invention. The components can here be tensioned within the casing 2 by means of a spring element 8, which abuts the interior wall of the casing 2 via corresponding spring lugs 10.

In another further development of the solution according to the invention, at least one spring element 8 is simultaneously designed as a flow conducting element, which forces the fuel to become thoroughly mixed as it flows through the heating device 1. This is easily discernible from FIG. 2 based on the spring lugs 10, which cause the fuel streaming through the heating device 1 in an axial direction 11 to swirl. Therefore, spring elements 8 designed in this way perform two tasks simultaneously.

Taking a closer look at the heat protection elements 7 and 7' according to FIGS. 1 and 2, it becomes evident that fixation elements 13 are situated toward the back in the insertion direction 12, latching with corresponding counter-latching devices on the casing 2 or engaging corresponding recesses in the casing with the heat transfer device 6 completely inserted into the casing 2 or the heat transfer elements 7 and 7' completely inserted. The fixation elements 13 can here be designed as latching lugs, for example, which interact with corresponding latching holes in the casing. Of course, other latching modes are also conceivable, wherein the spring lugs 10 of the spring element 8 projecting in a radial direction can engage latching recesses arranged on an interior side of the casing 2, thereby bringing about a fixation in the axial direction. As an alternative, the fixation elements 13 can be bent back after inserted to ensure an axial fixation of the components even during operation of the fuel filter.

In order to be able to insert the conglomerate of components according to FIG. 2 into the casing 2 in the right position, the interior side of the tubular casing 2 exhibits two guiding devices, for example guiding grooves, which interact with the at least one PTC heating element 5 and/or with the heat transfer device 6 in such a way that the PTC heating element 5 and the heat transfer device 6 consisting of the two heat transfer elements 7 and 7' can be axially inserted into the casing 2 in order to assemble the heating device 1. Therefore, the guiding device facilitates the assembly on the one hand, and increases quality on the other.

Figure 3:
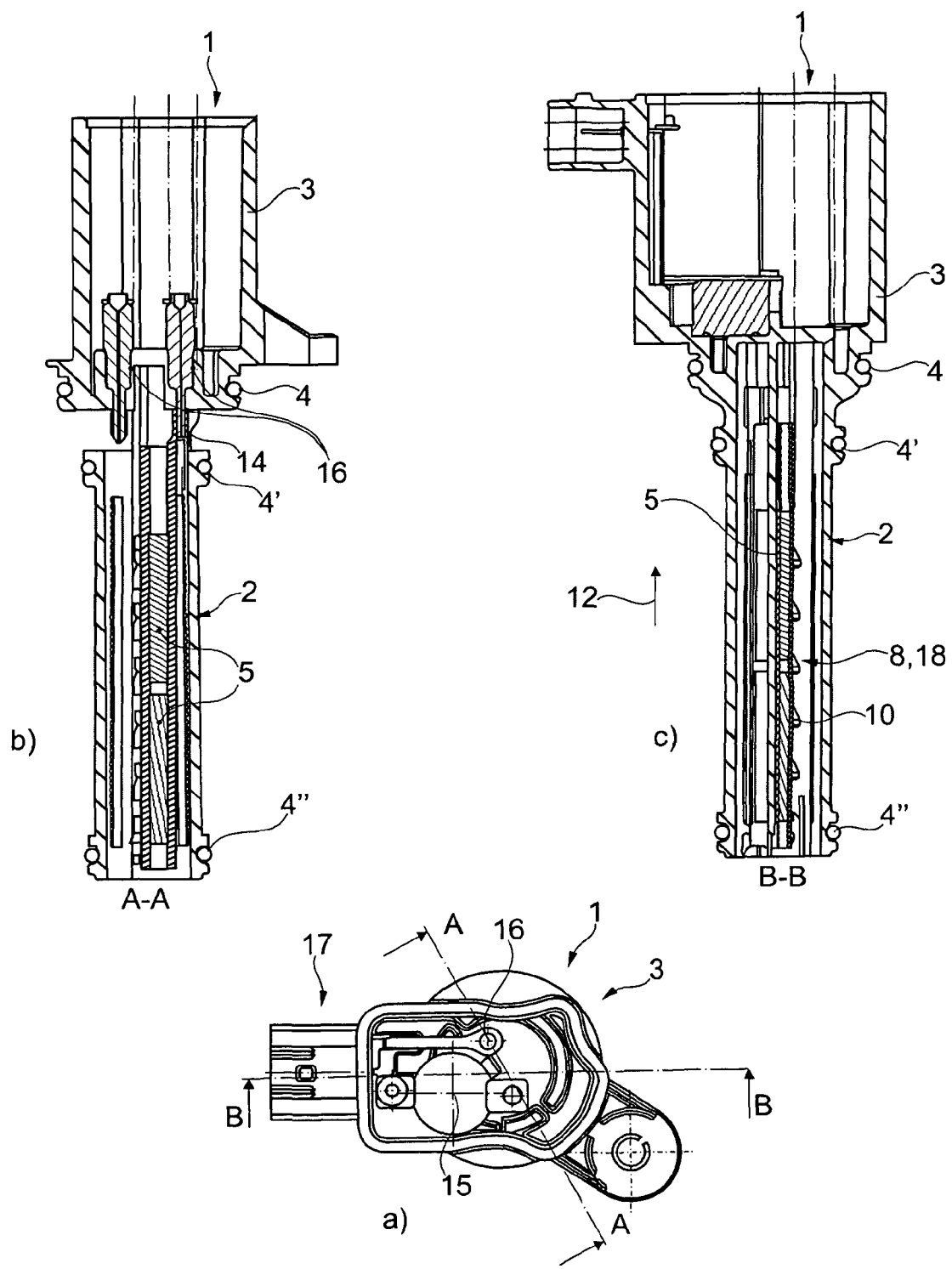
FIG. 3a to 3c are various sectional views through the heating device according to the invention.

Provided on the heat transfer elements 7 and 7' toward the front in the insertion direction 12 are contact elements 14 and 14', with which an electrical connection can be established to a power supply in the terminal enclosure 3 (see FIG. 3a). A plug or coupling can be provided on the terminal enclosure 3 to connect the PTC heating element 5 with an electrical network. In addition, a bimetal element 15 can be provided in the terminal enclosure 3 to control the heating device 1.

According to FIG. 3b, the two contact elements 14 and 14' of the heat transfer elements 7 and 7' are electrically connected with corresponding plugs 16 and 16' in the terminal enclosure 3, wherein the plugs 16 and 16' are in turn electrically connected with the coupling 17. The bimetal element 15 is here situated on one of the plug contacts, and interrupts an electrical contact at corresponding temperatures, and hence the heating capacity of the heating device 1.

As evident from looking at FIG. 4, a spring system 18 separate from the heat transfer device 6 is provided, which prestresses the heat transfer device 6 against a guiding device so as to fix it in place. According to FIG. 4, the guiding device here exhibits three radial webs 19a, 19b, 19c that extend into the interior of the tubular casing 2, wherein the spring system 18 is located opposite the radial web 19b, thereby pressing the heat transfer device 6 against the radial web 19b. The three radial webs 19a, 19b, 19c and the spring device 18 are here staggered by a respective 90° relative to each other. The spring lugs 10 cause the latter to be simultaneously designed as a turbolator, which forces the fuel to become thoroughly mixed while flowing through the heating device 1.

In the embodiment shown on FIG. 4, the fixation elements 13 are only bent back after the heat transfer device 6 has been completely inserted into the casing 2, and thereby moved into their fixing position, in which they engage recesses in the casing, and reliably prevent the heat transfer device 6 from falling out of the casing 2.

The invention claimed is:

1. A heating device for fuel, comprising:
    at least one PTC heating element; and
    a heat transfer device in thermal contact with the at least one PTC heating element, which exhibits two heat transfer elements, between which the at least one PTC heating element is arranged, and is clamped with a tubular casing constructed of a plastic based material that envelops the heat transfer device and the at least one PTC heating element;
    wherein the casing and the heat transfer device are for selectively receiving fuel to be heated during operation of the heating device through the casing and around the heat transfer device;
    wherein a guiding device is provided on an interior side of the tubular casing, which interacts with at least one of the at least one PTC heating element and the heat transfer device in such a way that the at least one PTC heating element and the heat transfer device that is selected is axially inserted into the casing in order to assemble the heating device, wherein the guiding device exhibits at least three radial webs that extend into the interior of the tubular casing;
    wherein a spring system separate from the heat transfer device is provided, which tensions the heat transfer device against the guiding device so as to fix the guiding device in place.

2. The heating device according to claim 1, wherein the at least three radial webs and the spring system are each offset by a respective ninety degrees relative to each other.

3. The heating device according to claim 1, wherein the spring system is simultaneously designed as a turbolator, which is for forcing fuel to become thoroughly mixed while flowing through the heating device.

4. The heating device according to claim 1, wherein the front of the heat transfer elements is provided with fixation elements, which are one of meshed and engaged with corresponding recesses in the casing once the heat transfer device has been completely inserted into the casing.

5. The heating device according to claim 1, wherein a contact element is provided on at least one heat transfer element toward the front in an insertion direction, which is used to establish an electrical connection to the power supply in a terminal enclosure.

6. The heating device according to claim 5, wherein the terminal enclosure is constructed of a plastic based material, and gated to the casing of the heating device.

7. The heating device according to claim 5, wherein at least one of the following is selected:
    i. the terminal enclosure exhibits one of a plug and coupling which can be connected with an electrical network, and
    ii. the terminal enclosure incorporates a bimetal element for controlling the heating device.

8. The heating device according to claim 1, wherein the two heat transfer elements are constructed of a metal based material.

9. The heating device according to claim 1, wherein the spring system is constructed of a metal based material.

10. The heating device according to claim 1, further comprising a fuel filter.

11. The heating device according to claim 8, wherein the metal based material is a sheet metal.

12. The heating device according to claim 9, wherein the metal based material is a sheet metal.

13. The heating device according to claim 2, wherein the spring system is simultaneously designed as a turbolator, which is for forcing fuel to become thoroughly mixed while flowing through the heating device.

14. The heating device according to claim 2, wherein the front of the heat transfer elements is provided with fixation elements, which are one of meshed and engaged with corresponding recesses in the casing once the heat transfer device has been completely inserted into the casing.

15. A heating device for fuel, comprising:
    at least one PTC heating element; and
    a heat transfer device in thermal contact with the at least one PTC heating element, which exhibits two heat transfer elements, between which the at least one PTC heating element is arranged, and is clamped with a tubular casing constructed of a plastic based material that envelops the heat transfer device and the at least one PTC heating element;
    wherein the casing and the heat transfer device are for selectively receiving fuel to be heated during operation of the heating device through the casing and around the heat transfer device;
    wherein a guiding device is provided on an interior side of the tubular casing, which interacts with at least one of the at least one PTC heating element and the heat transfer device in such a way that the at least one PTC heating element and the heat transfer device that is selected is axially inserted into the casing in order to assemble the heating device, wherein the guiding device exhibits at least three radial webs that extend into the interior of the tubular casing;
    wherein a spring system separate from the heat transfer device is provided, which tensions the heat transfer device against the guiding device so as to fix the guiding device in place, wherein the front of the heat transfer elements is provided with fixation elements, which are one of meshed and engaged with corresponding recesses in the casing once the heat transfer device has been completely inserted into the casing.

16. A heating device for fuel, comprising:
    at least one PTC heating element; and
    a heat transfer device in thermal contact with the at least one PTC heating element, which exhibits two heat transfer elements, between which the at least one PTC heating element is arranged, and is clamped with a tubular casing constructed of a plastic based material that envelops the heat transfer device and the at least one PTC heating element;
    wherein the casing and the heat transfer device are for selectively receiving fuel to be heated during operation of the heating device through the casing and around the heat transfer device;
    wherein a guiding device is provided on an interior side of the tubular casing, which interacts with at least one of the at least one PTC heating element and the heat transfer device in such a way that the at least one PTC heating element and the heat transfer device that is selected is axially inserted into the casing in order to assemble the heating device, wherein the guiding device exhibits at least three radial webs that extend into the interior of the tubular casing;
wherein a spring system separate from the heat transfer device is provided, which tensions the heat transfer device against the guiding device so as to fix the guiding device in place, wherein the spring system is simultaneously designed as a turbolator, which is for forcing fuel to become thoroughly mixed while flowing through the heating device.

17. The heating device according to claim 16, wherein a contact element is provided on at least one heat transfer element toward the front in an insertion direction, which is used to establish an electrical connection to the power supply in a terminal enclosure.

18. The heating device according to claim 16, wherein the two heat transfer elements are constructed of a metal based material.

19. The heating device according to claim 16, wherein the spring system is constructed of a metal based material.

* * * * *